United States Patent [19]

Marrison et al.

[11] Patent Number: 4,776,614
[45] Date of Patent: Oct. 11, 1988

[54] COUPLING WITH LOCK INDICATOR

[75] Inventors: William C. Marrison; Alan R. Allread, both of Jackson, Mich.

[73] Assignee: Aeroquip Corporation, Jackson, Mich.

[21] Appl. No.: 114,498

[22] Filed: Oct. 30, 1987

[51] Int. Cl.⁴ ............................................. F16L 35/00
[52] U.S. Cl. ........................................ 285/87; 285/93; 285/316
[58] Field of Search ...................... 285/86, 87, 88, 316, 285/315, 93

[56] References Cited

U.S. PATENT DOCUMENTS

| | | | |
|---|---|---|---|
| 1,613,644 | 1/1927 | Costello | 285/87 X |
| 3,084,713 | 4/1963 | Parrish | 285/88 X |
| 3,359,015 | 12/1967 | Zahuranec | 285/316 X |
| 4,150,846 | 4/1979 | Fleischer | 285/87 |

Primary Examiner—Dave W. Arola
Attorney, Agent, or Firm—Beaman & Beaman

[57] ABSTRACT

A coupling fitting utilizing radially moving detents operated by an axially displaceable locking sleeve employs a safety lock lever pivotally mounted upon the locking sleeve engagable with a reference surface on the fitting when the locking sleeve is in the locked condition to lock the sleeve and give both a visual and physically discernible indication of the condition of the locking sleeve. The safety lever includes a handle which conforms to the configuration of the locking sleeve when the sleeve is in the release position, and the lever handle extends from the configuration of the locking sleeve in the sleeve lock position. Preferably, two locking safety levers are mounted upon the locking sleeve at diametrically opposed locations.

9 Claims, 1 Drawing Sheet

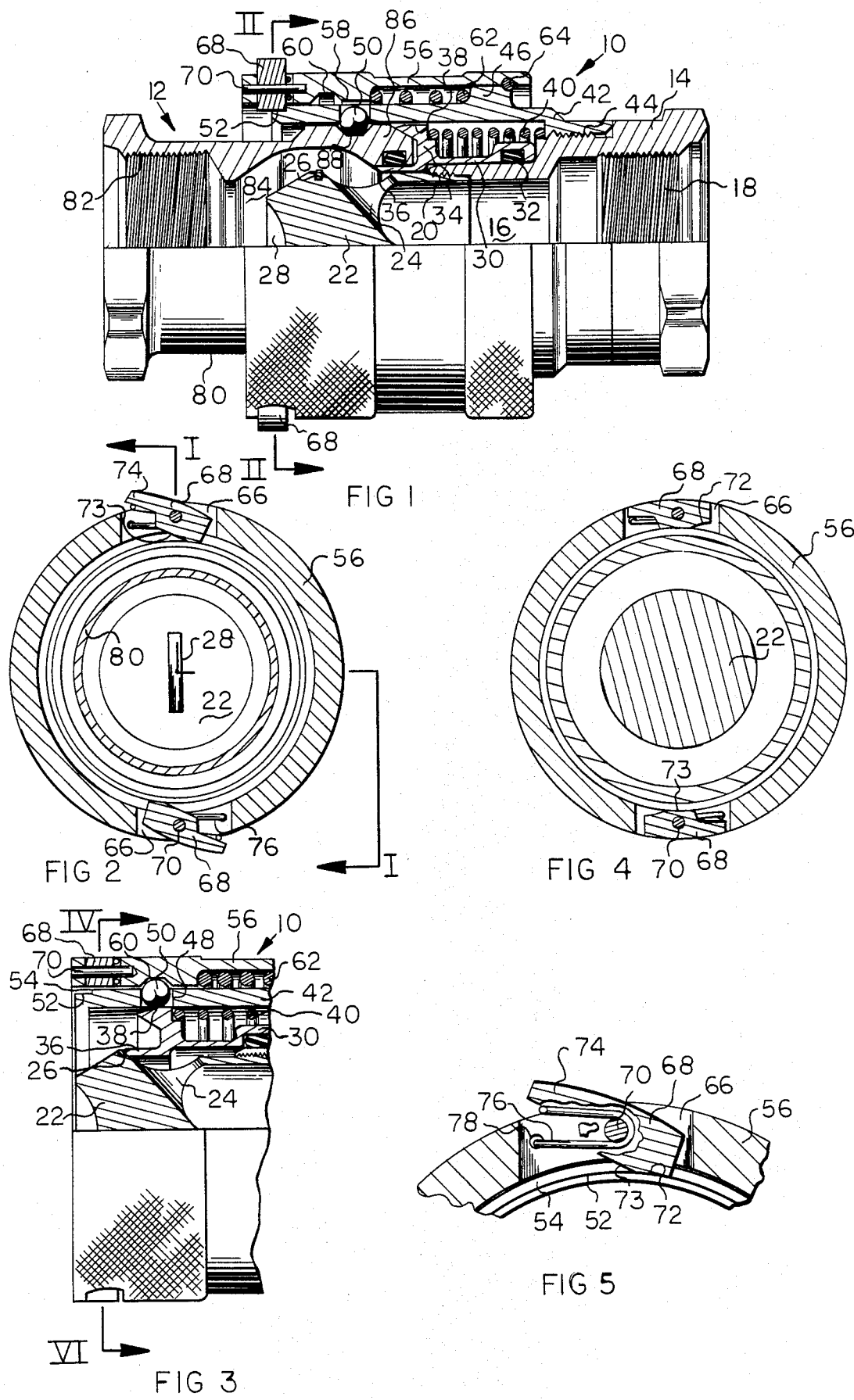

COUPLING WITH LOCK INDICATOR

BACKGROUND OF THE INVENTION

Fluid couplings consist of two parts which interconnect in a sealed relationship to permit the transfer of fluid therethrough. Such couplings are normally employed to interconnect conduit systems, hoses, and the like, and releasable couplings employ manually operated mechanisms for permitting the coupling halves to be selectively engaged and disengaged.

A common fluid coupling arrangement consists of male and female members wherein the female member includes an axially displaceable locking sleeve having cam surfaces defined thereon for radially displacing detents within the female fitting half. When radially displaced inwardly the detents engage with an interconnected male fitting half to achieve the coupling assembly. Usually, the coupling sleeve is spring biased in the direction displacing the detents, which are often cylindrical balls. However, under shock and vibration forces it is possible for the locking sleeve to be inadvertently displaced sufficiently to permit the detents to be released and permitting the parts to separate.

Also, if the male half is not properly oriented within the female half the detents will not fully engage the male half and only a partial or incomplete coupling may be achieved, and the operator may not sense that the locking sleeve has not been displaced to the full locking position. Upon pressurization of a fluid system having a partially interconnected coupling it is possible for the coupling parts to be separated upon the system being pressurized with disastrous results.

It is an object of the invention to provide a positive union sleeve lock for use with couplings having an axially displaceable locking sleeve wherein use of the lock prevents inadvertent locking sleeve displacement under shock, impact or vibration forces.

Another object of the invention is to provide a positive lock for fittings having axially displacement lock sleeves wherein the lock may be readily manually operated during the gripping of the lock sleeve for manual actuation thereof.

Yet an additional object of the invention is to provide a positive locking feature for fittings having axially displaceable locking sleeves wherein the lock and release conditions of the locking sleeve are readily indicated and discernible by the operator by both observation and touch.

A further object of the invention is to provide a positive lock for a coupling having an axially displaceable locking sleeve wherein safety locking levers mounted upon the locking sleeve automatically pivot to a locking position upon the locking sleeve being displaced to the full lock condition, and manual actuation of the locking levers is only required for release.

In the practice of the invention an annular locking sleeve is mounted upon a coupling half having cam surfaces defined thereon for actuating detents mounted in the associated coupling half. Usually, the locking sleeve is biased by a compression spring toward the locking direction.

At least one safety locking lever is mounted upon the locking sleeve, and preferably, two safety levers are mounted upon the locking sleeve at diametrically related positions. The safety levers pivot about axes or pivot pins substantially parallel to the length of the associated fitting, and the safety levers include an inner portion engaging a reference surface defined upon the fitting while the outer portion of the levers comprise handles capable of projecting radially from the configuration of the locking sleeve when the locking sleeve is in the fully locked condition.

The safety levers are mounted adjacent the open outer end of the locking sleeve, and the associated coupling fitting includes an annular groove or recess having a radial shoulder located adjacent the fitting open end. Once the locking sleeve has been axially displaced by its compression spring to the fully locked condition the innermost portion of the safety levers will be received within the groove and engage the groove and its radial shoulder. This engagement between the locking levers and the groove and shoulder prevents the locking sleeve from being retracted toward the released condition. Torsion springs bias the safety levers in a pivotal direction engaging the safety levers with the fitting groove and shoulder, and the safety levers will automatically be received within the fitting groove only upon alignment therewith when the locking sleeve is displaced to the fully locked condition.

The safety levers are mounted within openings or recesses defined in the locking sleeve, and the levers are of such a configuration as to conform to the normal outer shape of the locking sleeve when the locking sleeve is in the release condition, and a surface defined upon the safety levers engages with a cylindrical surface formed on the associated fitting to maintain the safety levers within their associated opening as not to project therefrom when the locking sleeve is in any axial location except when in the fully locked condition. Upon the safety levers being aligned with the fitting groove and shoulder the inner end of the safety levers is received therein causing the outer handle portion of the safety levers to radially project outwardly from their opening and from the configuration of the locking sleeve. This extending of the handle portions of the safety levers from the configuration of the locking sleeve renders the condition of the locking levers easily observable by the operator, and the safety lever positions may also be physically discerned by touch due to their projection from the locking sleeve configuration.

When it is desired to disconnect the coupling halves, the operator grasps the locking sleeve and simultaneously depresses the handle portions of the locking levers disengaging the levers from the fitting groove and shoulder. Such releasing of the safety levers permits the locking sleeve to be displaced against the biasing action of its compression spring and permits the locking sleeve to be axially displaced to the condition which releases the detents permitting separation of the coupling halves.

The use of the safety locking levers in accord with the invention provides positive restrain against inadvertent displacement of the locking sleeve toward a release condition, and yet, manual release of the locking levers is readily accomplished without necessitating troublesome or complex manipulation. The manufacturing and assembly costs of utilizing a safety locking lever in accord with the invention is relatively small, and the operation of the locking levers requires no special skills.

BRIEF DESCRIPTION OF THE DRAWINGS

The aforementioned objects and advantages of the invention will be appreciated from the following description and accompanying drawings wherein:

FIG. 1 is an elevational, partially sectioned view of a coupling showing interconnected parts utilizing the concepts of the invention as taken along Section I—I of FIG. 2, FIG. 2 is an elevational, sectional view as taken along Section II—II of FIG. 1, FIG. 3 is an elevational, partially sectioned view of a portion of a female fitting using the concepts of the invention, the locking sleeve being shown in the release condition, FIG. 4 is an elevational, sectional view as taken along Section IV—IV of FIG. 3, and FIG. 5 is an enlarged, detail, elevational, sectional view of a safety locking lever similar to that shown in FIG. 2 illustrated in the locked condition.

DESCRIPTION OF THE PREFERRED EMBODIMENT

A fluid coupling utilizing the concepts of the invention is illustrated in assembled relationship in FIG. 1 wherein the female coupling part 10 is fully connected in sealed relationship to the male part 12.

The female part 10 includes an annular adapter 14 which includes a central bore 16 and the adapter is internally threaded at 18 for connection to a hose, pipe or other conduit system, as is well known. The adapter is also internally threaded at 20 permitting the valve 22 to be mounted upon the adapter and the valve 22 includes a plurality of ports 24 communicating with the bore 16. An annular seat 26 is defined upon the valve 22 and includes a resilient seal. A T-slot 28 defined in the end of the valve 22 permits the valve to be rotated for assembly to the adapter.

A valve sleeve 30 is mounted upon a cylindrical surface of the adapter and is axially displaceable thereon and sealed to the adapter by the elastomeric seal 32. A radially extending ridge 34 defined upon the valve sleeve 30 is disposed toward the valve nose 36, and the ridge 34 includes a cam surface 38 for retaining the ball detents as later described. A compression spring 40 biases the valve sleeve 30 to the left, FIG. 1, for maintaining engagement of the nose 36 with the valve seat 26 when the coupling parts are disconnected.

An annular body 42 is also threaded upon the adapter 14 at threads 44 and the body 42 includes an annular shoulder 46. Ball openings 48, FIG. 3, are defined in the body 42 and a plurality of such openings exist and receive the detent balls 50.

At its outer end, the body 42 includes a cylindrical groove 52 inwardly defined by a radial shoulder 54, and as later described these surfaces cooperate with the safety locking levers.

A lock sleeve 56 is mounted upon the body 42 and is axially displaceable thereon. The lock sleeve 56 includes a cylindrical cam surface 58 employed to engage and maintain the detents 50 in an inward locked position, and the lock sleeve also includes an annular detent recess 60 adjacent the cam surface 58 for permitting the detents to be retracted from the locked position. A compression spring 62 engaging the shoulder 46 biases the lock sleeve 56 toward the left and the stop wire 64 mounted in the lock sleeve engages the shoulder 46 to limit displacement of the lock sleeve toward the left, FIG. 1.

A pair of slots or openings 66 are defined in the lock sleeve in opposed diametrical relationship adjacent the open end of the lock sleeve. Each of the openings 66 includes a safety latch or lever 68 located therein pivotally mounted upon a pivot pin 70 extending in a direction substantially parallel to the axis of the adapter bore 16. The safety latch levers 68 each include a concave inner surface 72 having a radius substantially corresponding to that of the surface 52, and the latch lever surface 73 substantially corresponds to the diameter of the body 42 adjacent the detent openings 48.

The latch levers 68 also include an outer handle 74, and the outer configuration of the latch levers is of a generally convex configuration having a radius corresponding to the adjacent diameter of the lock sleeve 56 as will be appreciated from FIG. 4. A torsion spring 76 extends about the pivot pins 70 and one end of the spring engages the handle 74 while the other end of the spring is received within a hole 78 defined in the associated opening 66 wherein a biasing action is imposed upon the safety latch levers tending to raise the handle 74 and move the inner portion of the levers inwardly.

The male member 12 includes an annular body 80 internally threaded at 82 for connection to the end of a hose, pipe, or other conduit. The male part 12 includes the bore 84 and the male part terminates in a nose 86 in which the annular detent-receiving groove 88 is defined.

When the fitting parts 10 and 12 are disconnected, the components of the female part 10 will be as illustrated in FIG. 3. In this condition the valve sleeve 30 is biased to the left by spring 40 engaging the nose 36 with the valve seat 26 thereby closing the ports 24 and sealing the part 10 against fluid flow therethrough. The cam surface 38 will be engaging the innermost portion of the detent balls 50 and the detents will be received within the lock sleeve recess 60 positioning the lock sleeve in the illustrated location. At this position of the lock sleeve 56 the safety latch levers will be disposed over the portion of the body 42 intermediate the surface 52 and the detent openings 48. The latch lever surfaces 73 will be engaging the outer surface of the body 42 as shown in FIG. 4 and the engagement of these surfaces will locate the latch handles 74 within the associated opening 66 retracting the handles 74 from the configuration of the lock sleeve 56 and the operator will be able to easily observe the retracted condition of the latch handles 74, and by touch, sense this condition of the latch levers.

When the parts 10 and 12 are interconnected the nose 86 is inserted into the female part 10 and the nose engages the valve sleeve ridge 34 displacing the valve sleeve to the right, FIG. 1. An elastomeric seal establishes a fluid-tight connection between the nose 86 and the valve sleeve. As the nose 86 continues to be inserted into the body 42 the detents 50 will ride over the exterior surface of the nose until the ball groove 88 is aligned with the detents. Upon such alignment occuring the oblique sides of the lock sleeve recess 60 force the ball detents inwardly into ball groove 88 and the lock sleeve 56 assumes the position of FIG. 1 wherein the detents will be maintained in the ball groove 88 by the cam surface 58, and stop wire 64 will engage shoulder 46.

When the lock sleeve 56 has been displaced to its full locking condition the safety latch levers 68 will be aligned with the surfaces 52 permitting the latch surfaces 72 to engage grooves 52 as shown in FIGS. 1, 2 and 5. This alignment permits pivotal movement of the latch levers which projects the handles 74 from the openings 66 and outwardly from the configuration of the lock sleeve 56 as shown in FIGS. 2 and 5. When the latch levers are in this locked condition movement of the lock sleeve 56 to the right, FIG. 1, i.e. a release condition, is prevented due to the engagement of the latches 68 against the shoulder 54. Thus, inadvertent movement of the lock sleeve 56 to a release condition is positively prevented.

When the latch levers 68 pivot to the locked position of FIG. 2 the projecting of the handles 74 from the configuration of the lock sleeve opening 66 is readily observable and physically discernible by touch. Thus, even under poor visibility situations the locked condition of the sleeve 56 is readily dicernible by the operator, and the use of the safety latches 68 permits a positive check of the condition of the coupling parts to be quickly made.

Disconnection of the coupling parts 10 and 12 is achieved by the operator grasping the lock sleeve 56, and as the latch lever handles 74 extends from the configuration of the lock sleeve, the handles 74 may be quickly depressed with the simultaneous action of gripping the lock sleeve. Maintaining the handles 74 in a depressed condition permits the operator to readily displace the lock sleeve 56 to the right against spring 62 to align the ball recess 60 with the detents 50 permitting the coupling parts 10 and 12 to be quickly disconnected in the normal manner. Such disconnection of the parts permits the valve sleeve 30 to again engage the valve seat 26 to seal passage 16.

It is appreciated that various modifications to the inventive concepts may be apparent to those skilled in the art without departing from the spirit and scope of the invention.

We claim:

1. In a coupling fitting including a body having an axially extending passage for receiving a complementary fitting, an annular locking sleeve mounted on said body translatable between first and second positions and coupling locking means mounted on said body operated by said sleeve for locking the body to the complementary fitting and positioned to a lock condition at said sleeve first position and movable to a release condition at said sleeve second position, the improvement comprising, a pivot pin mounted on the sleeve, a latch pivotally mounted upon said pivot pin positionable between a lock position and a release position, latch receiving means defined on the fitting body receiving said latch at said lock position, said latch retaining the sleeve in the first position when in said lock position and permitting the sleeve to be displaced to the second position when in said release position.

2. In a coupling fitting as in claim 1, said latch comprising a lever pivotally mounted upon said pivot pin pivotal between said lock and release positions.

3. In a coupling fitting as in claim 2, said pivot pin mounted on the locking sleeve having an axis substantially parallel to the fitting body passage.

4. In a coupling fitting as in claim 2, said latch receiving means comprising an annular groove having a radially extending shoulder, said lever being received within said groove when pivoted to said lock position.

5. In a coupling fitting as in claim 2, spring means biasing said lever toward said lock position.

6. In a coupling fitting as in claim 1, an exterior surface defined upon the fitting locking sleeve, said latch projecting from said exterior surface when in one of its positions to provide a visual and physically discernible indication of its position.

7. In a coupling fitting as in claim 1, an exterior surface defined upon the fitting locking sleeve, said latch comprising a lever with said pivot pin substantially parallel to the axis of said passage, a handle defined on said lever, said handle extending radially outwardly from said exterior surface when said latch lever is in said lock position and located within the axial projection of said exterior surface when said latch lever is in said release position to provide a visible and physically discernible indication of the position of said lever.

8. In a coupling fitting as in claim 7, a pair of latch levers each pivotally mounted upon a said pivot pin mounted on the locking sleeve, said latch levers being diametrically related to each other with respect to the body passage axis.

9. In a coupling fitting as in claim 1, spring means biasing said latch toward said lock position.

* * * * *